Oct. 23, 1923.
J. W. JONES
1,472,005
GUARD FOR MOTOR VEHICLES AND THE LIKE
Filed May 7, 1921
FIG _1_
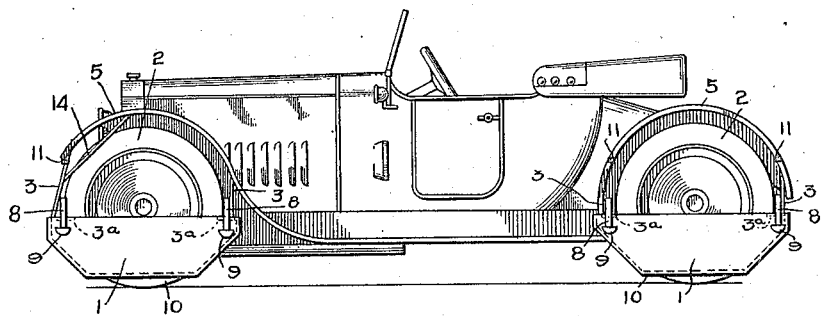
FIG _2_
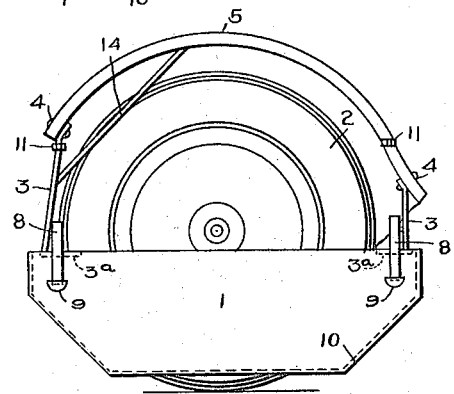
FIG _3_
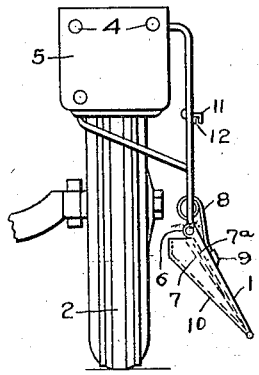
FIG _4_
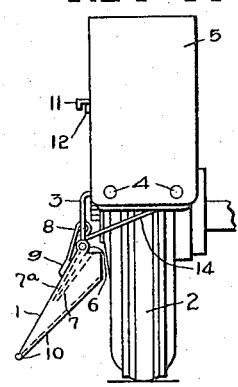
FIG _5_
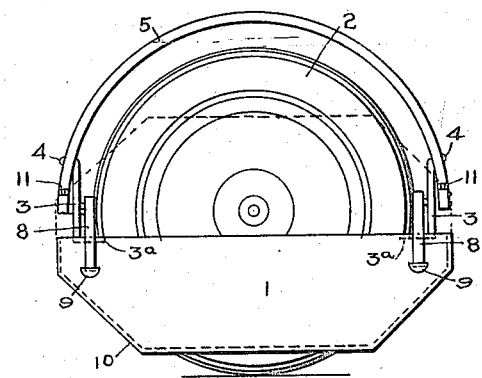
Inventor.
John W. Jones,
By Marks Clerk
Attys.

Patented Oct. 23, 1923.

1,472,005

UNITED STATES PATENT OFFICE.

JOHN WILLIAM JONES, OF AUCKLAND, NEW ZEALAND.

GUARD FOR MOTOR VEHICLES AND THE LIKE.

Application filed May 7, 1921. Serial No. 467,699.

*To all whom it may concern:*

Be it known that JOHN WILLIAM JONES, citizen of Dominion of New Zealand, residing at Auckland, in the Provincial District of Auckland, New Zealand, has invented a Guard for Motor Vehicles and the like, of which the following is a specification.

This invention relates to guards used on motor and other vehicles, and its object is to provide means for preventing mud and water being splashed on pedestrians and other traffic, and buildings, by passing vehicles.

The invention consists in providing special guards on the outside of the vehicle wheels, said guards being fitted low enough to prevent water and mud being thrown sideways from the vehicle, on the wheels thereof entering a pool or the like.

The guards comprise plates hinged to the lower ends of stays or arms secured either to the ordinary mud guards or other parts of the vehicle, said plates being held by springs against sloping arms so as to clear inequalities of the road over which the vehicle is travelling.

When not required the hinged plates can be turned upwards and held in a raised position by clips or buttons.

In order that the invention may be more clearly understood it will be further described with reference to the accompanying drawing in which:—

Figure 1 is a side view of a motor car showing the special guards in use thereon and Figures 2 and 3 are enlarged side and front views respectively of a front wheel showing a guard in position while Figures 4 and 5 are similar views of a rear wheel.

The plates 1 comprising the guards are mounted horizontally outside the wheels 2 by being hinged at their upper edges to the lower ends of stays or arms 3 secured by bolts 4 either to the ordinary mud guards 5 of a vehicle, or to some other part thereof.

In hinging the plates 1 to the stays 3, the former are preferably provided with lugs or projections 6 adapted to be passed upon the inturned ends 3ª of the stays 3, the latter being capable of being sprung sufficiently far enough apart to enable the lugs or projections 6 to be passed upon and slipped off the inturned ends 3ª as required. By these means the plates 1 can be easily and quickly detached and after they are removed the wheel is enabled to be got at without trouble.

Projecting downwards and outwards from the lower ends of the stays 3 are arms 7 each provided with a pad or cushion 7ª preferably of rubber. The plates 1 are caused to occupy a sloping position against said arms 7 by flat springs 8 each coiled and secured at one end on a stay 3 and entered at the other end in a catch or projection 9 on the guard.

The plates 1 are formed preferably with tapered and inturned ends, and have their edges reinforced or strengthened with wire or rod 10.

The depth of the plates 1 is such that when they are in the sloping or inclined position against the arms 7 as shown in the drawing, they prevent mud and water from being thrown outwards by the wheels, while their lower edges are high enough above the ground to clear inequalities of the road.

The pads or cushions 7ª on the arms 7 prevent the plates 1 from vibrating or rattling against the latter.

When the guards do not require to be used they can be turned upwards on their hinges against the action of the springs 8 and be secured in the raised position (see dotted position Figure 5) by revolving clips or catches 11 on the stays 3 or mud guards 5 as is found most convenient, cushions or pads 12 being provided on said stays or mud guards to prevent the guards 1 from rattling.

In fitting front wheels with the plates 1, the latter must be located at a sufficient distance from the wheels to allow for turning movement of the latter.

The guards 1 besides serving as a means of preventing the splashing of pedestrians and other traffic and buildings, by passing vehicles, also serve as a means of preventing persons from getting beneath the vehicle wheels.

Additional stays 14 can be provided where required to stiffen or hold rigid the guard supporting stays 3.

What I do claim and desire to obtain by Letters Patent of the United States is:—

1. A guard for motor and other vehicles, comprising stays secured to the vehicle, a guard plate hinged at the lower ends of said stays for movement about a horizontal axis and arranged at the outer side of one of the vehicle wheels, said plate being imperforate and adapted to cover substantially the entire lower half of the wheel, downwardly and outwardly sloping arms arranged between the plate and wheel for limiting the movement of the plate towards said wheel, and springs normally causing said plate to rest on said arms.

2. A guard for motor and other vehicles comprising a plate hinged on the outside of a wheel, to the inturned lower ends of stays secured to the vehicle; downwardly and outwardly sloping arms on said stays arranged between the plate and wheel for limiting the movement of the plate toward said wheel; springs on the latter pressing said plate against said arms and catches for holding said plate in a raised position against the action of said springs substantially as described and illustrated.

3. A guard for motor and other vehicles, comprising a plate with inturned ends and reinforced edges on the outside of a wheel secured to the inturned lower ends of stays secured to the vehicle; downwardly and outwardly projecting arms at the lower ends of said stays; pads on said arms; springs coiled and secured at one end to the supporting stays and entered at their other ends in projections on the plate pressing the latter against the pads on said arms and pivoted catches for holding said plate in a raised position and pads against which said plate is retained in its raised position substantially as described and illustrated.

In testimony whereof I have affixed my signature in presence of two witnesses:

JOHN WILLIAM JONES.

Witnesses:
WILLIAM PRICHER,
M. PILKINGTON.